(12) United States Patent
Pfeiffer et al.

(10) Patent No.: US 9,742,044 B2
(45) Date of Patent: Aug. 22, 2017

(54) BATTERY CELL

(75) Inventors: Stefan Pfeiffer, Bamberg (DE); Kai Kuhlmann, Bamberg (DE); Thomas Kretschmar, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 477 days.

(21) Appl. No.: 13/992,987

(22) PCT Filed: Oct. 20, 2011

(86) PCT No.: PCT/EP2011/068335
§ 371 (c)(1),
(2), (4) Date: Aug. 16, 2013

(87) PCT Pub. No.: WO2012/076233
PCT Pub. Date: Jun. 14, 2012

(65) Prior Publication Data
US 2013/0316216 A1 Nov. 28, 2013

(30) Foreign Application Priority Data
Dec. 10, 2010 (DE) ........................ 10 2010 062 858

(51) Int. Cl.
| | |
|---|---|
| *H01M 10/613* | (2014.01) |
| *H01M 10/6556* | (2014.01) |
| *H01M 10/6551* | (2014.01) |
| *H01M 10/6554* | (2014.01) |
| *H01M 10/654* | (2014.01) |
| *H01M 10/647* | (2014.01) |
| *H01M 10/0525* | (2010.01) |

(52) U.S. Cl.
CPC ...... *H01M 10/5046* (2013.01); *H01M 10/613* (2015.04); *H01M 10/654* (2015.04); *H01M 10/6551* (2015.04); *H01M 10/6554* (2015.04); *H01M 10/6556* (2015.04); *H01M 10/0525* (2013.01); *H01M 10/647* (2015.04)

(58) Field of Classification Search
CPC ............. H01M 10/613; H01M 10/625; H01M 10/647; H01M 10/65; H01M 10/665; H01M 10/6551; H01M 10/6554; H01M 10/6556; H01M 10/6555; H01M 10/656–10/6569; H01M 10/0525; H01M 10/05; H01M 10/654
See application file for complete search history.

(56) References Cited

U.S. PATENT DOCUMENTS

2007/0133151 A1* 6/2007 Jeon .................... H01M 2/1016
361/600
2007/0178377 A1* 8/2007 Kim ..................... H01M 2/021
429/152
(Continued)

FOREIGN PATENT DOCUMENTS

| DE | 102008059952 | 6/2010 |
|---|---|---|
| JP | 51-84041 | 7/1976 |
| JP | 3-109269 | 11/1991 |

(Continued)

*Primary Examiner* — Eugenia Wang
(74) *Attorney, Agent, or Firm* — Norton Rose Fulbright US LLP; Gerard Messina

(57) ABSTRACT

A battery cell, in particular a lithium-ion battery cell, includes a housing, at least two electrical storage elements and a conductive cooling sheet metal. The at least two storage elements and the conductive cooling sheet metal are situated in the housing.

6 Claims, 2 Drawing Sheets

(56) References Cited

U.S. PATENT DOCUMENTS

2007/0269714 A1 11/2007 Watanabe et al.
2012/0009455 A1* 1/2012 Yoon .............................. 429/120

FOREIGN PATENT DOCUMENTS

| JP | 2005056655 | 3/2005 |
| JP | 2006351373 | 12/2006 |
| JP | 2007273348 | 10/2007 |
| JP | 2009-259748 | 11/2009 |
| WO | WO2010067943 A1 * | 6/2010 |
| WO | WO 2010/083982 | 7/2010 |
| WO | WO2010083982 | 7/2010 |

* cited by examiner

BATTERY CELL

FIELD OF THE INVENTION

The present invention relates to a battery cell.

BACKGROUND INFORMATION

Different kinds of batteries are known from the related art. Such a battery is shown for example in German Published Patent Application No. 10 2008 059 952. A battery (or a battery system), as is used for example in hybrid or electric vehicles, normally is made up of multiple battery modules, which in turn are composed of individual battery cells (e.g. lithium-ion battery cells). An individual battery cell has a housing and electrical storage elements (which are also called galvanic cells or simply cells), which are situated in the housing. The waste heat arising during the charging and discharging process of the battery cell due to the flow of current must be dissipated by cooling. Due to the sometimes high power density, high requirements are placed on the cooling system. A number of proposals are known for efficient cooling of battery cells, which however are often too complex, too expensive to manufacture or limited in their performance.

For example, the aforementioned German Published Patent Application No. 10 2008 059 952 describes a battery, in which the heat dissipation from the battery is ensured by placing the individual battery cell flatly onto a cooling plate that is located outside of the housing. The prerequisite for a good heat transfer between the battery cell and the cooling plate is a high degree of evenness of the contact surfaces. This device has the disadvantage, however, that the heating of the battery cell when charging and discharging increases the pressure within the housing. This pressure increase results in a bulging of the housing walls. This bulging of the housing walls decreases the contact surface between the battery cell and the cooling plate, which results in a reduction of the cooling effect. It is furthermore disadvantageous that the waste heat arising within the electrical storage elements of the battery cell when charging and discharging, must first reach the contact surface between housing and cooling plate by thermal conduction in order finally to be dissipated there. The waste heat is thus disadvantageously not dissipated in close proximity to the electrical storage elements, which results in a poor cooling effect of the battery cell.

It is the objective of the present invention to indicate a battery cell, which provides effective cooling of the electrical storage elements of the battery cell and is simple and cost-effective to manufacture.

SUMMARY

The battery cell according to the present invention has the advantage that the waste heat arising when charging and discharging is dissipated in a highly efficient manner from the electrical storage elements of the battery cell.

For this purpose, the present invention provides for at least two storage elements and a conductive cooling sheet metal to be situated in the housing. Since the waste heat in charging and discharging arises directly in the electrical storage elements, it is advantageous to situate the conductive cooling sheet metal together with the storage elements in the housing. This arrangement allows for the waste heat of the electrical storage elements to be dissipated more quickly via the conductive cooling sheet metal, which prevents the electrical storage elements and thus the battery cell from overheating. Additionally, the housing of the battery cell may be advantageously reduced in its wall thickness since the heat is no longer dissipated via the housing. This results in a reduction in weight and an associated reduction in cost.

The at least two electrical storage elements are advantageously in contact with the conductive cooling sheet metal. The contact ensures the heat transfer and is either a direct contact, in which the storage elements and the conductive cooling sheet metal touch directly, or a contact in which heat transfer also occurs when a heat transmitter such as for example a thermally conductive paste or a protective film or protective layer or the like is disposed between the storage elements and the conductive cooling sheet metal. An efficient heat transfer occurs on the basis of this contact between the conductive cooling sheet metal and the two electrical storage elements, which makes it possible to dissipate the heat in a highly efficient manner from the electrical storage elements.

Advantageously, the conductive cooling sheet metal is disposed in a first conductive cooling sheet metal section between the at least two electrical storage elements. Via the conductive cooling sheet metal, it is thus possible to dissipate both the heat of the one as well as the heat of the other storage element. A pressure increase within the battery cell, which is associated with a bulging of the housing walls, has no effect on the heat transfer.

The housing advantageously has an opening, through which a conductive cooling sheet metal engages by a second conductive cooling sheet metal section, and which is sealed off by a molding compound. The molding compound fixes the conductive cooling sheet metal and the at least two electrical storage elements in the housing. Furthermore, the molding compound ensures that no moisture is able to enter the housing.

Respectively one of the at least two electrical storage elements is advantageously in contact with the conductive cooling sheet metal with at least 30% of its surface. The heat transfer between the electrical storage element and the conductive cooling sheet metal occurs via this surface, which yields efficient cooling.

The conductive cooling sheet metal advantageously has a deformation in the second conductive cooling sheet metal section, which rises above a plane of the conductive cooling sheet metal. This deformation improves the retention in the molding compound. The deformation additionally has the effect of inhibiting the entry of moisture into the battery cell further and providing an improved moisture seal.

Advantageously, the conductive cooling sheet metal is fixed in a third conductive cooling sheet metal section located outside of the housing on a heat sink that has a cooling fluid flowing through it. The third conductive cooling sheet metal section, which protrudes from the molding compound, is in contact with the heat sink, which has cooling fluid flowing through it, and transfers the heat dissipated from the battery cell to the heat sink. The heat is finally dissipated advantageously from the heat sink via the cooling fluid flowing through it.

The conductive cooling sheet metal advantageously has at least one perforation in the third conductive cooling sheet metal section. The perforation is suitable for attaching the battery cell with the aid of the conductive cooling sheet metal to a suitable device, for example a heat sink, within a battery module, which is composed of multiple battery cells. It is thus possible to fix the battery cell spatially relative to other similar battery cells within a battery module. Attaching the battery cell on a suitable device allows for an additional transfer of heat from the battery cell to the device, which has a cooling effect on the battery cell.

The heat sink advantageously engages through the at least one perforation of the conductive cooling sheet metal. On the one hand, the battery cell is thus fixed on the heat sink with the aid of the conductive cooling sheet metal and may therefore be situated relative to other battery cells within a battery module. On the other hand, not only is the attachment of the battery cell ensured, but also the heat transfer between the conductive cooling sheet metal and the heat sink engaged through the conductive cooling sheet metal is improved. Additionally, this cooling concept allows for a quick exchange of defective battery cells since these may be strung up on the heat sink like pearls on a necklace and accordingly may be pulled off quickly from the heat sink.

The at least one perforation is advantageously developed as a sleeve open on both sides. This form of the perforation provides for a greater contact surface between the conductive cooling sheet metal and the heat sink, which improves the heat transfer between the conductive cooling sheet metal and the heat sink. This yields an efficient heat dissipation from the conductive cooling sheet metal and thus from the electrical storage elements. Additionally, when the heat sink engages through the perforation and the conductive cooling sheet metal is thus fixed on the heat sink, the battery cell is stabilized against tilting by the sleeve-like perforation that is open on both sides.

Advantageously, exactly one conductive cooling sheet metal is situated in the housing in the case of the battery cell of the present invention. A reduction in weight and a reduction in manufacturing costs is thereby achieved.

DETAILED DESCRIPTION

Figure 1:
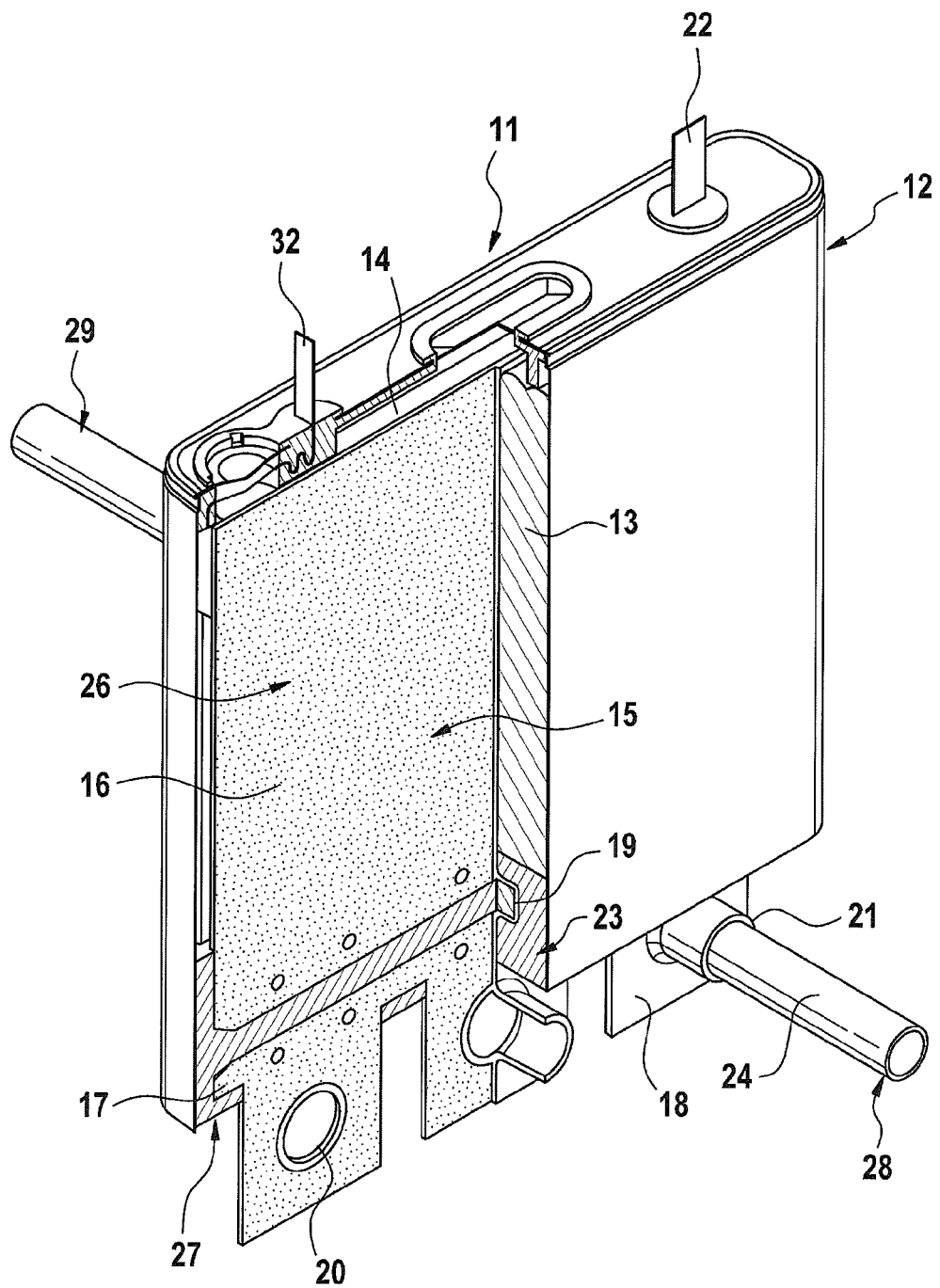
FIG. 1 shows a perspective sectional view of a battery cell.

FIG. 1 shows as an exemplary embodiment of the present invention a battery cell 11 in a perspective sectional view. Battery cell 11 is essentially rectangular and flat and has a small thickness. Battery cell 11 has two flag-like pole contacts 22 and 32, which extend out of the head side of its housing 12, and via which battery cell 11 may be contacted. In a first conductive cooling sheet metal section 16, two electrical storage elements 13, 14 are in direct contact with conductive cooling sheet metal 15. In this context, the first conductive cooling sheet metal section 16 is the entire region within which conductive cooling sheet metal 15 is situated between storage elements 13, 14. Storage elements 13, 14 may be developed in particular as lithium-ion storage cells in a flat construction without an intrinsically stiff casing ("jelly rolls" or "coffee bag"). Conductive cooling sheet metal 15 and electrical storage elements 13, 14 are situated in housing 12 of battery cell 11. Housing 12 has on one side an opening 27, through which conductive cooling sheet metal 15 engages. In a second conductive cooling sheet metal section 17 located in housing 12, which is not contacted by the two electrical storage elements 13, 14, conductive cooling sheet metal 15 has a deformation 19. This deformation 19 rises out of plane 26 of the otherwise flat conductive cooling sheet metal 15 and may be in the shape of a wave for example. In the region of second conductive cooling sheet metal section 17, opening 27 of housing 12 is sealed off by a molding compound 23. This molding compound 23 is made of plastic for example. In a third conductive cooling sheet metal section 18, conductive cooling sheet metal 15 has a perforation 20, which is developed in the form of a sleeve 21 that is open on both sides. This sleeve 21 is used to fix conductive cooling sheet metal 15 and thus the entire battery cell 11 on a heat sink 24. Heat sink 24 may be developed as a cooling pipe or cooling pipe system. Heat sink 24 has two connections 28 and 29 for supplying and removing a cooling fluid. Via connections 28 and 29, heat sink 24 is connectable to a coolant circuit (not shown), via which the waste heat taken up by the cooling fluid may be removed from the battery cell.

Figure 2:
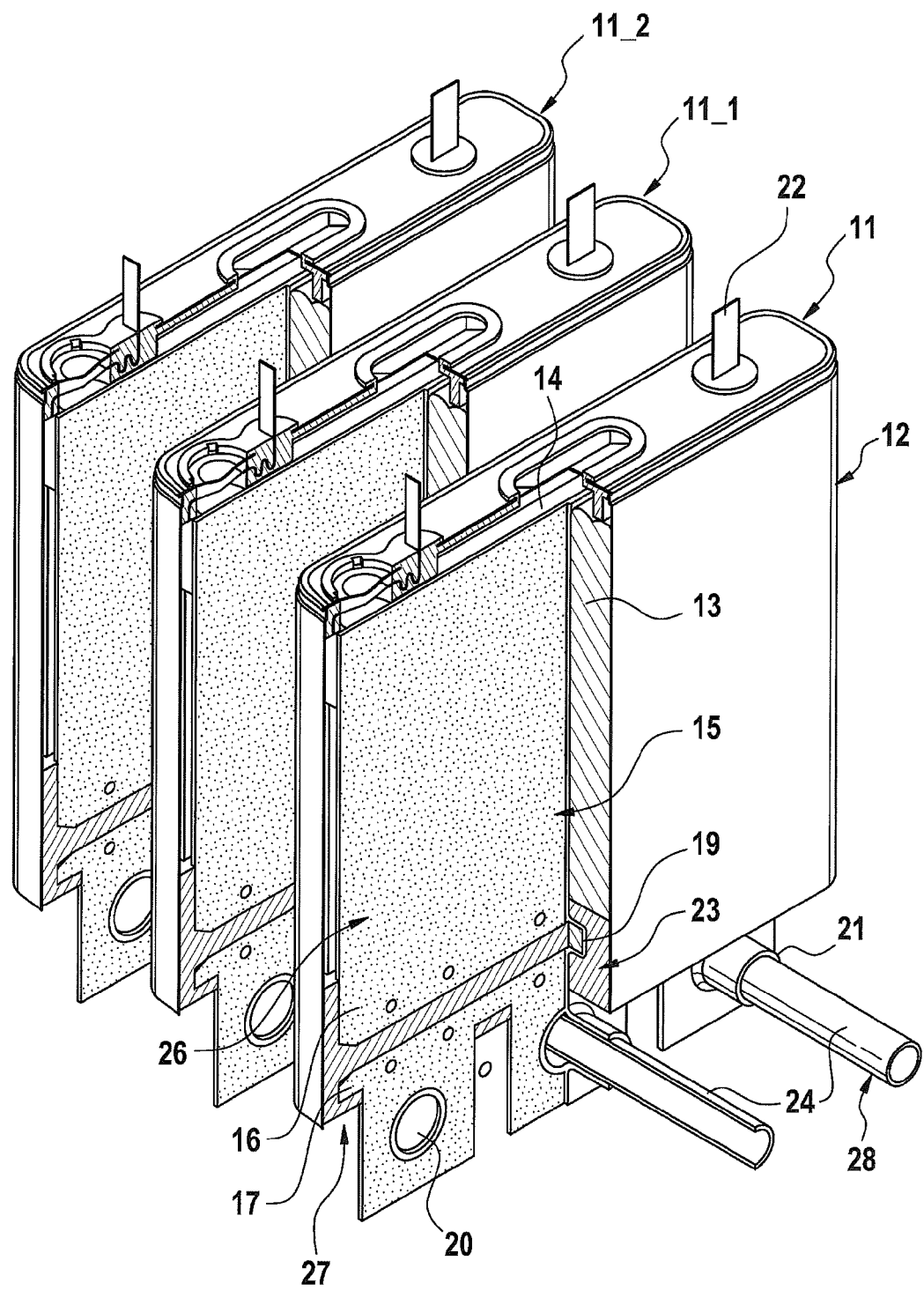
FIG. 2 shows a perspective sectional view of multiple battery cells situated in series.

As another exemplary embodiment of the present invention, FIG. 2 shows a perspective sectional view of multiple battery cells 11, 11_1 and 11_2 from FIG. 1. In a third conductive cooling sheet metal section 18, conductive cooling sheet metal 15 has a perforation 20, which is developed in the form of a sleeve 21 that is open on both sides. This sleeve 21 is used to fix conductive cooling sheet metal 15 and thus the entire battery cell 11 on a heat sink 24. Heat sink 24 may be developed as a cooling pipe or cooling pipe system. Heat sink 24 has two connections 28 and 29 (the latter not being shown here) for supplying and removing a cooling fluid. Via connections 28 and 29, heat sink 24 is connectable to a coolant circuit (not shown), via which the waste heat taken up by the cooling fluid may be removed from the battery cell. Heat sink 24 allows for a parallel and serial arrangement of the battery cells, which are connectable to one another in parallel or/and in series, depending on the application. This type of connection of conductive cooling sheet metal 15 and heat sink 24 spatially fixes battery cells 11 relative to one another and allows them to be exchanged quickly in case of a defect.

What is claimed is:

1. A battery cell, comprising:
   a housing;
   at least two electrical storage elements; and
   a conductive cooling sheet metal, wherein the at least two electrical storage elements and the conductive cooling sheet metal are situated in the housing, wherein the conductive cooling sheet metal includes a first conductive cooling sheet metal section, the first conductive cooling sheet metal section being disposed between the at least two electrical storage elements, and wherein the conductive cooling sheet metal includes a deformation, the deformation connecting the first conductive cooling metal section and a second conductive cooling sheet metal section, the deformation rising up from a plane of the conductive cooling sheet metal and being contained within the housing; and
   a molding compound, wherein the housing includes an opening, through which the second conductive cooling sheet metal section of the cooling sheet metal engages, and which is sealed off by the molding compound.

2. A battery cell, comprising:
   a housing;
   at least two electrical storage elements; and
   a conductive cooling sheet metal;
   wherein the at least two electrical storage elements and the conductive cooling sheet metal are situated in the housing, wherein the conductive cooling sheet metal includes a first conductive cooling sheet metal section, the first conductive cooling sheet metal section being disposed between the at least two electrical storage elements, and wherein the conductive cooling sheet metal includes a deformation, the deformation connecting the first conductive cooling metal section and a second conductive cooling sheet metal section, the deformation rising up from a plane of the conductive cooling sheet metal and being contained within the housing, wherein the conductive cooling sheet metal includes a third conductive cooling sheet metal section, the third conductive cooling sheet metal section being located outside of the housing on a heat sink that has a cooling fluid flowing therethrough, and wherein the conductive cooling sheet metal is fixed in the third conductive cooling sheet metal section on the heat sink.

3. The battery cell as recited in claim 2, wherein the conductive cooling sheet metal includes at least one perforation in the third conductive cooling sheet metal section, the perforation extending from a first planar surface of the cooling sheet metal to an opposite, second planar surface of the cooling sheet metal.

4. The battery cell as recited in claim 3, wherein the heat sink engages through the at least one perforation of the conductive cooling sheet metal.

5. The battery cell as recited in claim 4, wherein the at least one perforation of the conductive cooling sheet metal includes a sleeve that is open on both sides.

6. The battery cell as recited in claim 5, wherein exactly one conductive cooling sheet metal and exactly two electrical storage elements are situated in the housing.

* * * * *